INVENTOR
Raymond H. Cowles
BY Evans & McCoy
ATTORNEYS

United States Patent Office 2,749,160
Patented June 5, 1956

2,749,160
STEEL BACKED RUBBER BUSHINGS

Raymond H. Cowles, Wabash, Ind., assignor to The General Tire and Rubber Company, Akron, Ohio, a corporation of Ohio Application August 9, 1949, Serial No. 109,268

3 Claims. (Cl. 287—85)

This invention relates to rubber articulated joints and mountings of the general type having rubber under relatively high radial compression and axial elongation. It particularly relates to improvements in mountings or joints of this type suitable for use in shackles or spring suspensions of motor vehicles.

The Thiry Patent No. 1,782,770 discloses a process of making joints and connections having the rubber highly radially compressed and axially elongated between two concentric sleeves. The rubber articulated joints of this patent have been widely and successfully used in automotive vehicles both in the United States and in Europe and for some applications have been considered much superior to the joints produced by axially compressing rubber bushings to cause them to swell against the inner and outer concentric members. However, the bushings as described in the Thiry patent have a weakness in that they have had relatively low resistance to axial thrust, with the result that there is a tendency for the inner sleeve to creep axially relatively to the outer sleeve when the joints are subjected to high axial thrust, particularly when such axial thrust is coupled with torsional movement as is had at present with spring shackles. For this reason, the bushings described in the Thiry patent have not been widely used by American automotive manufacturers in shackle portions of spring suspensions, but have been largely confined to the one end of a leaf spring where the end thrust is relatively less.

Because the load on the bushings and joints in vehicles is for the most part normal to the axis or a torsional load and because the diameter of the joints must be the least possible diameter consistent with load to permit wide angle torsional movement, it is desirable that the main portion of the bushing be substantially cylindrical, i. e. it is desirable that the rubber annulus be maintained in the bushing largely in cylindrical shape, and that any portion which resists axial thrust be a relatively small portion of the total joint or bushing.

Because of the recognized limitations of the earlier joints having rubber under high radial compression, rubber-articulated joints suitable for withstanding end thrust have been proposed in which frusto-conical elements, during assembly of the joints, are pressed axially from each side of the bushing to squeeze the rubber against the inner and outer rigid members of the joints. Such articulated joints are disclosed in Leon F. Thiry's French Patent No. 621,443, demanded July 27, 1926, and published May 11, 1927, and in Charles R. Short's United States Patent No. 1,750,607 of 1930. The joints of these patentees cannot be assembled in the manner of the aforementioned Thiry United States patent to give the desirable characteristics of rubber under high radial compression and axial elongation; these joints must utilize a relatively long annulus which is relatively slightly compressed by axial movement of the cones and have a considerably larger diameter for same load sustaining ability than have the joints of the aforementioned Thiry United States patent.

It is an object of the present invention to provide a rubber articulated joint of the general type having rubber under high radial compression and axial elongation, in which joint the outer and inner coaxial rigid elements are substantially cylindrical over a major portion of their rubber contacting area but which still has relatively high resistance to axial displacement and will not creep by torsional and axial stresses.

It is another object of the present invention to provide a rubber articulated joint resistant to axial creep and still capable of withstanding high load (normal to axis) to diameter ratio.

It is another object of the present invention to provide a method of making such rubber articulated joints.

It is a further object of the present invention to provide a vehicle suspension and particularly a shackle portion thereof having rubber articulated joints which have high resistance to axial creep when subjected to both axial stress and torsion to permit metal to metal contact.

These and other objects will be apparent from the following detailed description of the present invention as illustrated in the accompanying drawing, in which.

Figure 2:
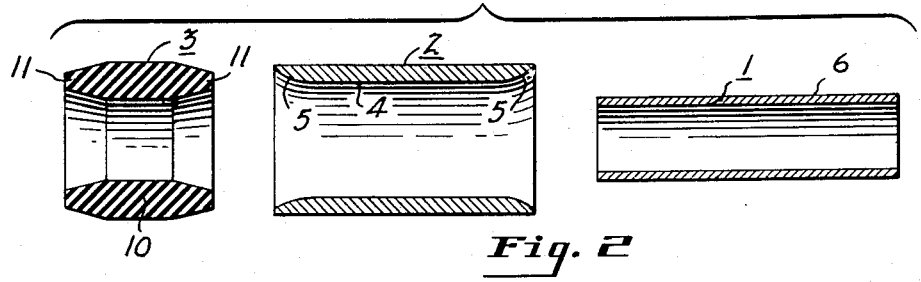
Fig. 2 is a longitudinal sectional view through elements which when assembled together form a joint embodying the present invention.

Referring more particularly to the drawing, wherein like parts are indicated by like numerals of reference throughout the several views, the joints of the present invention, as do the joints of the prior art, comprise an inner rigid element or sleeve 1, an outer rigid element or sleeve 2 concentric therewith, and an annulus of rubber 3 which is maintained by the inner and outer rigid members (preferably generally tubular) 1 and 2, respectively, in a state of relatively high axial elongation and radial compression from its normally molded state as shown in Figure 2. In accordance with the present invention, however, a major portion of the inner surface 4 of the outer tubular rigid element or member 2 is cylindrical and the end portions 5 thereof are outwarly flared to provide generally frusto-conical portions 5 for contact with a portion of the rubber annulus 3. Preferably, the flared end portions 5 may be produced by simply removing portions of the member 2 adjacent its end portions so that the member 2 has walls of gradually increasing thickness as one progresses from the outer edges a short distance toward the central or median portion of the member 2. The inner tubular rigid member 1, which is concentric with the outer tubular rigid member 2 and spaced therefrom by the distance of the annulus 3, also has a generally cylindrical external surface 6, which constitutes a major portion of the external surface or face thereof, adapted to contact the rubber annulus 3. The inner tubular rigid member 1 also has the end portions thereof outwardly flared to produce the generally frusto-conical surface 7 which is substantially parallel to or is quite uniformly spaced from the outwardly flared frusto-conical inner surface portion 5 of the outer rigid member 2.

The annulus 3, is shown in Figure 2 in a natural molded state. Before the annulus 3 is distorted by radial compression between the inner and outer rigid members during the telescopic assembly thereof into coaxial relation, it has a relatively thick wall portion 10, which preferably has inner and outer cylindrical surfaces, at the central region thereof and relatively thinner end wall portions 11 adjacent the ends. Preferably, the wall portions gradually diminish in thickness from adjacent the wall portions 10 to the ends of the bushing and I ordinarily make the end portions generally frusto-conical with the thicker portions thereof closest to the median plane of the bushing or adjacent the portions 10. When the joints are to be subjected to deteriorating liquids or to sunlight etc., it is important to have the end portions of the bushing relatively thin. They may then be in a comparatively unstressed state in the assembled bushing, with the result that these exposed portions have superior resistance to deterioration because of weather and contact with liquids that deteriorate rubbery materials rapidly when they are maintained under a state of high distortion.

Figure 1:
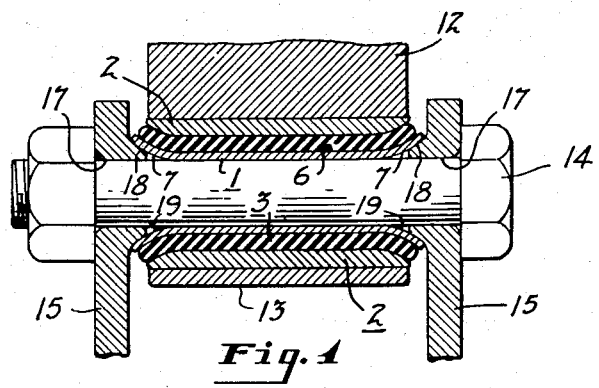
Figure 1 is a sectional view through a portion of a shackle portion of a vehicle suspension showing in position a rubber articulated joint embodying the present invention.

The bushings or joints of the present invention are especially desirable as vibration absorbing supports between a mounted member and a mounting member as for example in vehicle suspensions such for example as illustrated by Figure 1. The previously assembled joint comprising the inner and outer rigid tubular members with the bushing of rubbery material therebetween is pushed into the eye or ring formed by the frame portion 12 and the loop 13 of the mounted member so that the outer rigid sleeve or tubular member 2 is rigid with the frame portion 12. Means, such as the connecting links 15 and the bolt 14 are provided for rigidly attaching the mounting member or under carriage of a vehicle to the inner rigid member 1. The links 15 may have around the portions of the bolt-receiving openings 17 thereof a pintle portion having generally frusto-conical surfaces 18 which are adapted to be held tightly against inner frusto-conical surfaces 19 of the inner rigid member 1 and adjacent the end portion thereof by the bolt 14.

The frusto-conical surfaces 18 are concentric with the axis of the bolt 14 and the bolt-receiving openings 17 in the links 15 so that when the bolt is tightened these surfaces bear tightly against the surfaces 19 and prevent slippage of the inner rigid member 1 with respect to the links 15 of the suspended or supported member.

It will be seen from the above that the supported member which may be the under-carriage of the vehicle which is connected to the inner rigid member 1 may move relative to the supporting member or frame 12 only by further distortion of the bushing 3. Since the major portion of the weight of the vehicle is carried in a direction perpendicular to the surfaces 4 and 6 which are generally cylindrical, it is seen that bushings of the present invention have the same desirable characteristics as have the joints and pivotal connections disclosed in the aforementioned Thiry United States patent with the outwardly flared and generally frusto-conical end portions, a comparatively small portion of the rubber annulus resists large relative axial movement between the inner and outer members. By having the end portions of the rigid members outwardly flared, a substantially larger area for end thrust resistance is had without appreciably diminishing the cylindrical area of the bushing or joint, and without necessarily utilizing rubbery material under exceptionally high stress at the ends thereof. With the rubber uncompressed or relatively lightly compressed at the end portions the desired amount of axial movement is permitted but axial creep is prevented. Apparently for these reasons the joints of the present invention have exceptionally long life and are able to withstand extreme conditions.

Figures 3, 4:
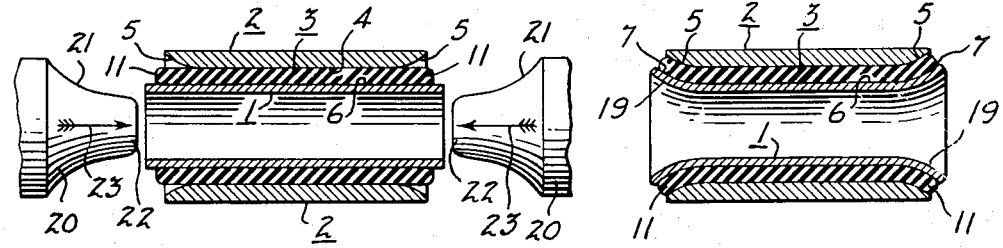
Fig. 3 illustrates a partly restricted joint embodying the present invention just after the elements of Fig. 2 have been telescoped together and shows tools suitable for swedging out or flaring out the outer end portions of the inner rigid member of the joint.
Fig. 4 shows a completed joint obtained after the swedging operation of Fig. 3.

The joints of the present invention are comparatively easy to assembly and may be made as illustrated by Figures 2 and 3, where it is seen that they may be manufactured to the state shown in Figure 3 in a manner exactly analogous to the method described in the aforementioned Thiry United States patent.

The rubber annulus may as illustrated by Thiry be first incorporated through a zone (not shown) of gradually diminishing diameter to the outer member 2 and the inner member rapidly moved through the central opening thereof into concentric relation with the members 3 and 2. The inner member 1 is first fitted with a suitable tapered leader member (not shown) as shown in the Thiry patent. The joint thus produced may then simply be placed between the flaring members 20 and on the axis thereof. The members 20 have generally conical surfaces 21 and a tip portion 22 of sufficiently small diameter to enter into the opening of the inner rigid tubular member 7. When the flaring members 20 are moved axially in the direction of the arrows 23 while the axis of the bushing in line with the axis of the members 20, the end portions of the inner member are outwardly flared to produce the frusto-conical surfaces 7 and 19 and to position the end portions 11 of the annulus therebetween.

Although the invention may be employed in various ways, only preferred embodiments have been illustrated and described. Other embodiments may be made within the invention as provided by the patent statutes.

What I claim is:

1. A rubber articulated joint comprising an outer rigid tubular member having a generally cylindrical inner surface portion, an inner rigid tubular member having a generally cylindrical outer surface portion generally concentric with said inner surface portion, a separately molded and vulcanized rubber annulus between said members, the end portions of said rubber annulus in its molded state having relatively thin walls compared to the wall thickness of said annulus in the central region thereof, said joint being further characterized by having the end portions of the inner surface of said outer member outwardly flared to provide a generally frusto-conical surface, by having the end portions of the inner tubular member outwardly flared to provide a generally frusto-conical surface spaced from said frusto-conical surface of said outer member, and by having end portions of said rubber annulus outwardly flared and separating said outwardly flared portions of said rigid members, the generally cylindrical area of said inner and outer rigid members being relatively large compared with the frusto-conical surfaces thereof and the central portion of said annulus bearing against said generally cylindrical area being under relatively high axial elongation and radial compression.

2. The rubber articulated joint according to claim 1 wherein the rubber annulus in its molded state has generally frusto-conical end portions of gradually increasing thickness from the ends thereof.

3. The rubber articulated joint according to claim 1 in which the end portions of said rubber annulus in its molded state have relatively thin walls compared to the wall thickness of said annulus in the central region thereof and in which the main central load supporting region of said rubber annulus is of uniform thickness with inner and outer cylindrical walls.

References Cited in the file of this patent

UNITED STATES PATENTS

| | | |
|---|---|---|
| 988,119 | Livingston et al. | Mar. 28, 1911 |
| 1,750,607 | Short | Mar. 11, 1930 |
| 1,871,861 | Rossman | Aug. 16, 1932 |
| 1,992,631 | Piquerez | Feb. 26, 1935 |
| 2,312,516 | Alldredge | Mar. 2, 1943 |
| 2,468,985 | Krotz | May 3, 1949 |
| 2,517,791 | Hutton | Aug. 8, 1950 |

FOREIGN PATENTS

| | | |
|---|---|---|
| 545,162 | Great Britain | May 13, 1942 |